United States Patent
Clarke et al.

(10) Patent No.: US 8,572,030 B2
(45) Date of Patent: *Oct. 29, 2013

(54) SYNCHRONIZING FILE PARTITIONS UTILIZING A SERVER STORAGE MODEL

(75) Inventors: Simon Peter Clarke, Seattle, WA (US);
Miko Arnab S. Bose, Seattle, WA (US);
Xuelei Sun, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/494,685

(22) Filed: Jun. 12, 2012

(65) Prior Publication Data

US 2012/0246117 A1    Sep. 27, 2012

Related U.S. Application Data

(63) Continuation of application No. 12/479,189, filed on Jun. 5, 2009, now Pat. No. 8,219,526.

(51) Int. Cl.
*G06F 17/30* (2006.01)

(52) U.S. Cl.
USPC .......................................................... 707/610

(58) Field of Classification Search
USPC .......................................................... 707/610
See application file for complete search history.

(56) References Cited

U.S. PATENT DOCUMENTS

| | | | |
|---|---|---|---|
| 5,774,868 A | 6/1998 | Cragun et al. | |
| 5,924,092 A | 7/1999 | Johnson | |
| 6,801,938 B1 | 10/2004 | Bookman | |
| 6,925,467 B2 | 8/2005 | Gu et al. | |
| 7,058,664 B1 | 6/2006 | Hsu | |
| 7,096,311 B2 | 8/2006 | Chiang | |
| 7,138,998 B2 | 11/2006 | Forest et al. | |

(Continued)

FOREIGN PATENT DOCUMENTS

| | | |
|---|---|---|
| CN | 1520562 | 8/2004 |
| JP | 2001-356948 | 12/2001 |

(Continued)

OTHER PUBLICATIONS

Brad Combs eMVP, http://xpefiles.com/cs/blogs/bcombs/archive/2007/08/21/howto-using-the-image-difference-engine-to-deploy-xpe-updates.aspx, 3 pgs. Aug. 21, 2007.

(Continued)

*Primary Examiner* — Etienne Leroux
(74) *Attorney, Agent, or Firm* — Merchant & Gould P.C.

(57) ABSTRACT

Embodiments are provided for synchronizing file partitions utilizing a server storage model in a client-server computer network. Edits to content of an electronic document may be received at a client computer. The content may be included in a first partition of a file stored on a server computer. The first partition may include a first stream which includes the electronic document content. The file may include multiple partitions with each partition including one or more streams. The client computer may generate metadata in a second partition of the file. The metadata may be associated with the edits to the electronic document content in the first partition. The second partition may then be individually synchronized with the server computer to store the metadata. The first partition may then be individually synchronized with the server computer to store the edits made to the electronic document content.

20 Claims, 7 Drawing Sheets

(56) References Cited

U.S. PATENT DOCUMENTS

| | | | |
|---|---|---|---|
| 7,146,377 | B2 | 12/2006 | Nowicki |
| 7,299,404 | B2 | 11/2007 | Agarwal et al. |
| 7,313,575 | B2 | 12/2007 | Carr et al. |
| 7,322,012 | B2 | 1/2008 | Ishii |
| 7,325,202 | B2 | 1/2008 | Shirriff |
| 7,702,563 | B2 | 4/2010 | Balson et al. |
| 7,750,908 | B2 | 7/2010 | Kincaid et al. |
| 8,078,957 | B2 | 12/2011 | Clarke et al. |
| 8,219,526 | B2 * | 7/2012 | Clarke et al. .......... 707/610 |
| 2002/0029227 | A1 | 3/2002 | Multer et al. |
| 2002/0129052 | A1 | 9/2002 | Glazer et al. |
| 2002/0184139 | A1 | 12/2002 | Chickering et al. |
| 2003/0004955 | A1 | 1/2003 | Cedola et al. |
| 2004/0054711 | A1 | 3/2004 | Multer |
| 2004/0133540 | A1 | 7/2004 | Saake |
| 2005/0010576 | A1 | 1/2005 | Ren et al. |
| 2005/0015436 | A1 | 1/2005 | Singh et al. |
| 2005/0223047 | A1 | 10/2005 | Shah |
| 2005/0289152 | A1 | 12/2005 | Earl |
| 2006/0010143 | A1 | 1/2006 | Netz et al. |
| 2006/0075004 | A1 | 4/2006 | Stakutis et al. |
| 2006/0085561 | A1 | 4/2006 | Manasse et al. |
| 2006/0095481 | A1 | 5/2006 | Singh |
| 2006/0112113 | A1 | 5/2006 | Gu et al. |
| 2006/0136387 | A1 | 6/2006 | Yalovsky et al. |
| 2006/0136472 | A1 | 6/2006 | Jujjuri et al. |
| 2006/0206533 | A1 | 9/2006 | MacLaurin et al. |
| 2007/0106679 | A1 | 5/2007 | Perrin et al. |
| 2007/0198659 | A1 | 8/2007 | Lam |
| 2008/0059539 | A1 | 3/2008 | Chin et al. |
| 2008/0098042 | A1 | 4/2008 | Tian et al. |
| 2008/0163056 | A1 | 7/2008 | Lamadon |
| 2008/0195601 | A1 | 8/2008 | Ntoulas et al. |
| 2009/0006936 | A1 | 1/2009 | Parker et al. |
| 2009/0125518 | A1 | 5/2009 | Bailor et al. |
| 2009/0144654 | A1 | 6/2009 | Brouwer et al. |
| 2009/0276459 | A1 | 11/2009 | Trout et al. |
| 2010/0211571 | A1 | 8/2010 | Prahlad et al. |
| 2012/0204090 | A1 | 8/2012 | Clarke et al. |

FOREIGN PATENT DOCUMENTS

| | | |
|---|---|---|
| JP | 2005-92583 | 4/2005 |
| JP | 2006-92558 | 4/2006 |
| JP | 2006-195966 | 4/2006 |
| JP | 2007-501969 | 2/2007 |
| JP | 2008-77485 | 4/2008 |
| KR | 10-2007-0013770 | 1/2007 |
| WO | WO 02/067128 | 8/2002 |
| WO | WO 2004/104752 | 12/2004 |
| WO | WO 2007/115149 | 10/2007 |
| WO | WO 2007/126381 | 11/2007 |
| WO | WO 2009/114218 | 9/2009 |

OTHER PUBLICATIONS

Chinese First Office Action in Application 201080025222.9, mailed Dec. 18, 2012, 11 pgs.
Chinese First Office Action in Application No. 200980115903.1, mailed Mar. 23, 2012, in Chinese with English translation; 7 pages.
Chinese Notice of Allowance in Application 200980115903.1, mailed Dec. 11, 2012, 4 pgs.
ECMerge Pro (Windows) 2.1 by Elliè Computing, http://www.bestvistadownloads.com/software/k-folder-directory-compare-merge-diff-synchronize-synchronization-t-free-ecmerge-pro-windows—download-trbfmlhl.html, 4 pgs. Retrieval date Nov. 2, 2007.
European extended Search Report in Application 10783964.9, mailed Oct. 26, 2012, 5 pgs.
Henny Bekker et al.: "Streaming media Caching and replication techniques". VIP D3 .1 C2, Version 1.1.0, Aug. 21, 2000, pp. 1-45. https://doc.telin.nl/dsweb/Get/Document-16054/Streaming_media_Caching_and_replication_techniques.pdf.
Japanese Notice of Allowance in Application 2011-507525, mailed Mar. 9, 2012, 6 pgs.
M. Satyanarayanan, "Coda: A Highly Available File System for a Distributed Workstation Environment," http://www.ks.uni-freiburg.de/download/studienarbeit/SS05/08-05-PVergINWDS-OHaller/Material/Coda/wwos2.pdf, 5 pgs. Retrieval date Nov. 2, 2007.
Paragon Drive Backup Enterprise Server Edition, Best Practices for MS SQL Server. pp. 1-34. http://download.paragon-software.com/doc/Best_Practices_MS_SQL_Server.pdf.
PCT International Search Report and Written Opinion in Application PCT/US2010/036968, mailed Dec. 27, 2010, 9 pages.
PCT International Search Report and Written Opinion mailed Nov. 30, 2009 in Application PCT/US2009/039796, 9 pgs.
Randal C. Burns et al., "Experimentally Evaluating In-Place Delta Reconstruction," http://www.soe.ucsc.edu/~darrell/Papers/MSST-Burns-02.pdf, pp. 137-151 Retrieval date Nov. 2, 2007.
Randal C. Burns et al., "In-Place Reconstruction of Delta Compressed Files," http://www.almaden.ibm.com/projects/data/storagesystems/podc98.pdf, 9 pgs. Retrieval date Nov. 2, 2007.
Torsten Suel et al., "Algorithms for Delta Compression and Remote File Synchronization," http://cis.poly.edu/suel/papers/delta.pdf, pp. 1-24. Retrieval date Nov. 2, 2007.
U.S. Appl. No. 12/113,975, Amendment and Response filed Jun. 23, 2011, 9 pgs.
U.S. Appl. No. 12/113,975, Notice of Allowance mailed Aug. 9, 2011, 5 pgs.
U.S. Appl. No. 12/113,975, Office Action mailed Feb. 23, 2011, 18 pgs.
U.S. Appl. No. 12/479,189, Amendment and Response filed Oct. 27, 2011, 13 pgs.
U.S. Appl. No. 12/479,189, Notice of Allowance mailed Dec. 16, 2011, 7 pgs.
U.S. Appl. No. 12/479,189, Notice of Allowance mailed Mar. 12, 2012, 7 pgs.
U.S. Appl. No. 12/479,189, Office Action mailed Jun. 27, 2011, 10 pgs.
Japanese Notice of Rejection in Application 2012-093148, mailed May 7, 2013, 4 pgs.
Chinese Second Office Action in Application 201080025222.9, mailed May 6, 2013, 9 pgs.
European Supplemental Search Report in Application 09739398.7, mailed Apr. 29, 2013, 15 pgs.
Preguica, Nuno et al, "Integrating Synchronous and Asynchronous Interactions in Groupware Applications", 2005, Groupware: Design, Implementation, and Use Lecture Notes in Computer Science; LNCS, Springer, Berlin, DE, pp. 89-104.
Preguica, Nuno et al., "Supporting disconnected operation in DOORS", Proceedings of the Eight Workshop on Hot Topics in Operating Systems (HOTOS-VIII), May 2001, XP055060498, Retrieved from the Internet: URL:http://www-asc.di.fct.unl.pt/dagora/docs/papers/hotos-extended.pdf, [retrieved on Apr. 22, 2013], pp. 1-6.
Pacull, Francois et al., "Duplex: A Distributed Collaborative Editing Environment in large Scale", Proceedings of the 1994 ACM Conference on Computer Supported Cooperative Work, CSCW '94, 1994, New York, New York, USA, pp. 165-173.
Pacull, Francois et al., "R-linearizability: an extension of linearizability to replicated objects", Distributed Computing Systems, 1993., Proceedings of the Fourth Worksh OP on Future Trends of Lisbon, Portugal, Sep. 22-24, 1993, Los Alamitos, CA, USA, IEEE, Comput. Soc, US, Sep. 22, 1993, pp. 347-353.
Preguica, Nuno et al., "System Support for Large-Scale Collaborative Applications", Technical report 01-98 DI-FCT-UNL, 1998, Departmento de Informatica Faculdade de Ciencias e Tecnologia Universidade Nova de Lisboa, Retrieved from the Internet: URL:http://www-asc.di.fct.unl.pt/-nmp/pubs/ref--55.pdf [retrieved on Apr. 18, 2013], pp. 1-11.
Japanese Notice of Allowance in Application 2012-514057, mailed Apr. 23, 2013, 6 pgs.
Russian Application 2010144794, Decision to Grant dated May 31, 2013, 6 pages.
Chinese Application 201080025222.9, Notice on the Third Office Action mailed Aug. 13, 2013, 10 pages.
Japanese Application 2012093148, Notice of Allowance filed Aug. 22, 2013, 3 pages.

* cited by examiner

SYNCHRONIZING FILE PARTITIONS UTILIZING A SERVER STORAGE MODEL

CROSS REFERENCE TO RELATED APPLICATIONS

This application is a continuation of U.S. patent application Ser. No. 12/479,189 (now U.S. Pat. No. 8,219,526), entitled "SYNCHRONIZING FILE PARTITIONS UTILIZING A SERVER STORAGE MODEL," filed Jun. 5, 2009, the contents of which is hereby incorporated in its entirety by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In client-server computer networks, an electronic document file may be edited by multiple users at different client computers. The electronic document file may include associated editing session data (e.g., metadata) which is different and independent from the main document file content. The electronic document file is synchronized between a client computer and a central server in order to store any edits made to the electronic document file which may then be viewed by users of other client computers in a network. Under existing synchronization methods, any associated metadata must be synchronized together with the edits made to the electronic document file. In particular, for markup language or object linking and embedding ("OLE") compound documents, metadata may be put in extensible file format for synchronization. As a result of the synchronization, the metadata associated with an electronic document file is automatically exposed on the server, even if a user synchronizing the electronic document file does not desire the metadata to be viewed by or downloaded (within the electronic document file) to other users. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for synchronizing file partitions utilizing a server storage model in a client-server computer network. Edits to content of an electronic document may be received at a client computer. The content may be included in a first partition of a file stored on a server computer. The first partition may include a first stream which includes the electronic document content. The file may include multiple partitions with each partition including one or more streams. The client computer may generate metadata in a second partition of the file. The metadata may be associated with the edits to the electronic document content in the first partition. The second partition may then be individually synchronized with the server computer to store the metadata. The first partition may then be individually synchronized with the server computer to store the edits made to the electronic document content.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for synchronizing file partitions utilizing a server storage model in a client-server computer network. Edits to content of an electronic document may be received at a client computer. The content may be included in a first partition of a file stored on a server computer. The first partition may include a first stream which includes the electronic document content. The file may include multiple partitions with each partition including one or more streams. The client computer may generate metadata in a second partition of the file. The metadata may be associated with the edits to the electronic document content in the first partition. The second partition may then be individually synchronized with the server computer to store the metadata. The first partition may then be individually synchronized with the server computer to store the edits made to the electronic document content.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
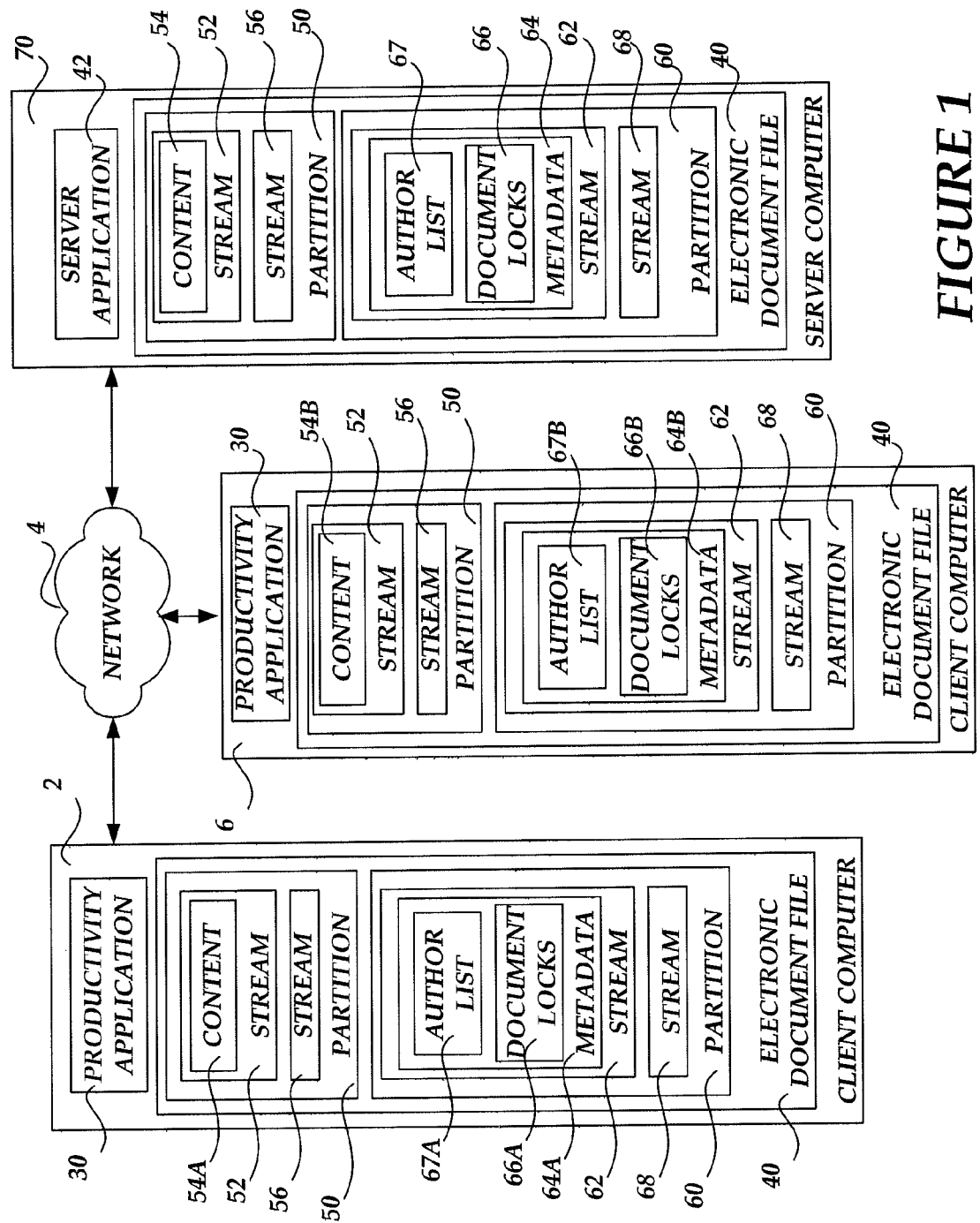
FIG. 1 is a block diagram illustrating a client-server network architecture which may utilize a server storage model for synchronizing file partitions, in accordance with various embodiments.

Referring now to the drawings, in which like numerals represent like elements through the several figures, various aspects of the present invention will be described. FIG. 1 is a block diagram illustrating a client-server network architecture which may utilize a server storage model for synchronizing file partitions, in accordance with various embodiments. The network architecture includes a client computer 2 and a client computer 6, both of which are in communication with a server computer 70 over a network 4. The network 4 which may include a local network or a wide area network (e.g., the Internet).

The client computer 2 may store a productivity application 30 which may be used to edit an electronic document file 40 (also stored on the client computer 2). In accordance with various embodiments, the productivity application 30 may comprise the WORD word processing software, the POWERPOINT presentation graphics program, and the GROOVE software from MICROSOFT CORPORATION of Redmond, Wash. It should be appreciated, however, that other productivity or application programs from other manufacturers may be utilized in accordance with the various embodiments described herein.

The electronic document file 40 may be received at the client computer 2 via a download operation over the network 4 from the server computer 70 or generated by the productivity application 30 on the client computer 30. The electronic document file 40 may include a partition 50. The partition 50 may include streams 52 and 56. The stream 52 may further include content (i.e., electronic document content) 54A. The electronic document file 40 may also include a partition 60. The partition 60 may include streams 62 and 68. The stream 62 may further include metadata 64A. In accordance with an embodiment, the metadata 64A may be associated with the content 54A stored in the partition 50. In particular, the metadata 64A may include an author list 67A describing one or more authors of the content 54A and document locks 66A describing a current user of the electronic document file 40 (e.g., a user currently editing the content 54A).

In accordance with various embodiments, a "partition" is defined as a "file" within a file (such as the electronic document file 40) and may contain one or more streams. A "stream," which is contained within a partition, contains data associated with an electronic document file (such as the content 54A or the metadata 64A). It should be understood that each of the partitions in a file may be synchronized independently of each other and at different synchronization rates (i.e., partitions in a single file may be synchronized at different times). Furthermore, multiple streams in the same partition are related to each other while no relationship may exist between streams in different partitions. For example, stream 56 comprise data associated with electronic document content (and thus related to stream 52) but may not contain metadata associated with the electronic document file 40. In addition, multiple streams in a given partition are synchronized simultaneously, thereby ensuring consistency between streams in the same partition.

The client computer 6 may store the productivity application 30 which also may be used to edit the electronic document file 40 (also stored on the client computer 6). The electronic document file 40 may be received at the client computer 6 via a download operation over the network 4 from the server computer 70 or generated by the productivity application 30 on the client computer 6. The electronic document file 40 may include the partition 50. The partition 50 may include the streams 52 and 56. The stream 52 may further include content (i.e., electronic document content) 54B. The electronic document file 40 may also include the partition 60. The partition 60 may include the streams 62 and 68. The stream 62 may further include metadata 64B. It should be understood, that in accordance with various embodiments, "metadata" represents content contained with a stream in a partition. In accordance with an embodiment, the metadata 64B may be associated with the content 54B stored in the partition 50. In particular, the metadata 64B may include an author list 67B describing one or more authors of the content 54B and document locks 66B describing a current user of the electronic document file 40 (e.g., a user currently editing the content 54B).

The sever computer 70 may store a server application 42. In accordance with various embodiments, the server computer 70 may function as a document storage system for electronic files created on the client computers 2 and 6. The server application 42 may comprise a collaborative services application program such as the SHAREPOINT SERVER services application from MICROSOFT CORPORATION. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized.

The server computer 70 may also store the electronic document file 40. The electronic document file 40 may include the partition 50. The partition 50 may include the streams 52 and 56. The stream 52 may further include content (i.e., electronic document content) 54. The electronic document file 40 may also include the partition 60. The partition 60 may include the streams 62 and 68. The stream 62 may further include metadata 64. In accordance with an embodiment, the metadata 64 may be associated with the content 54 stored in the partition 50. In particular, the metadata 64 may include an author list 67 describing one or more authors of the content 54 and document locks 66 describing a current user of the electronic document file 40 (e.g., a user currently editing the content 54). It should be understood, that in accordance an embodiment, the electronic document file 40 may be downloaded from the server computer 70 to the client computers 2 and 6 for editing thereby potentially creating different versions of the content 54 and the metadata 64 in the electronic document file 40 when changes are made prior to being synchronized back to the server computer 70. Thus, in the present detailed description, versions of the content 54 and the metadata 64 on the client computers 2 and 6 are identified by the letters "A" and "B" appended after the reference numerals for these file components.

In accordance with various embodiments and as will be described in greater detail below with respect to FIGS. 3-7, the sever application 42 and the productivity application 30 may be configured to facilitate the synchronization of the partitions 50 and 60 on the client computers 2 and 6, with the server computer 70. In accordance with an embodiment, the server application 42 may be configured to utilize a protocol (including, but not limited to a stateless protocol) to facilitate incremental document synchronization and to add support for server files to expose multiple independent or dependent data streams. Thus, each of the partitions in an electronic file may be synchronized independently of each other and at different synchronization rates (i.e., partitions in a single file may be synchronized at different times). For example, the server application 42 in conjunction with the productivity application 30, may be configured to synchronize the partition 60 (containing the metadata 64) on the client computer 2 with the server computer 70 before the partition 50 (containing the content 54A). It should be appreciated that by synchronizing partitions at different rates, the amount of data communicated to the server computer 70 over the network 4 is reduced, thereby improving server scalability. An illustrative stateless protocol which may be utilized in accordance with various embodiments is described in related patent application U.S. Ser. No. 12/113,975 entitled "Document Synchronization over Stateless Protocols," filed on May 2, 2008, the disclosure of which is incorporated herein, in its entirety, by reference.

It should be understood that that the various partitions and streams discussed with respect to the client computers 2 and 6, and the server computer 70, are merely illustrative and not limited to the number of partitions or streams which may be contained within an electronic document file in accordance with various embodiments. For example, in accordance with an embodiment, an electronic document file may contain only a single partition and a single stream while in accordance with other embodiments an electronic document file may contain multiple partitions and multiple streams. It should further be understood that, in accordance with various embodiments, the content of the streams contained within an electronic document file on the client computers 2 and 6 and the server computer 70 are not limited to metadata but may also include generic data (i.e., data which is not associated with content stored in an electronic document file partition) as well. It should further be understood that the embodiments described herein should not be construed as being limited to the aforementioned software applications and that other software applications from other developers and/or manufacturers may also be utilized. It should further be understood that the network architecture of FIG. 1 and its components include functionality to communicate with other computing devices, communication devices, and/or other systems and are not intended to be limited to the embodiments and examples described herein. Thus, for example, the network architecture of FIG. 1 may include additional client computers in communication with the server computer 70, in accordance with various embodiments.

Exemplary Operating Environment

Figure 2:
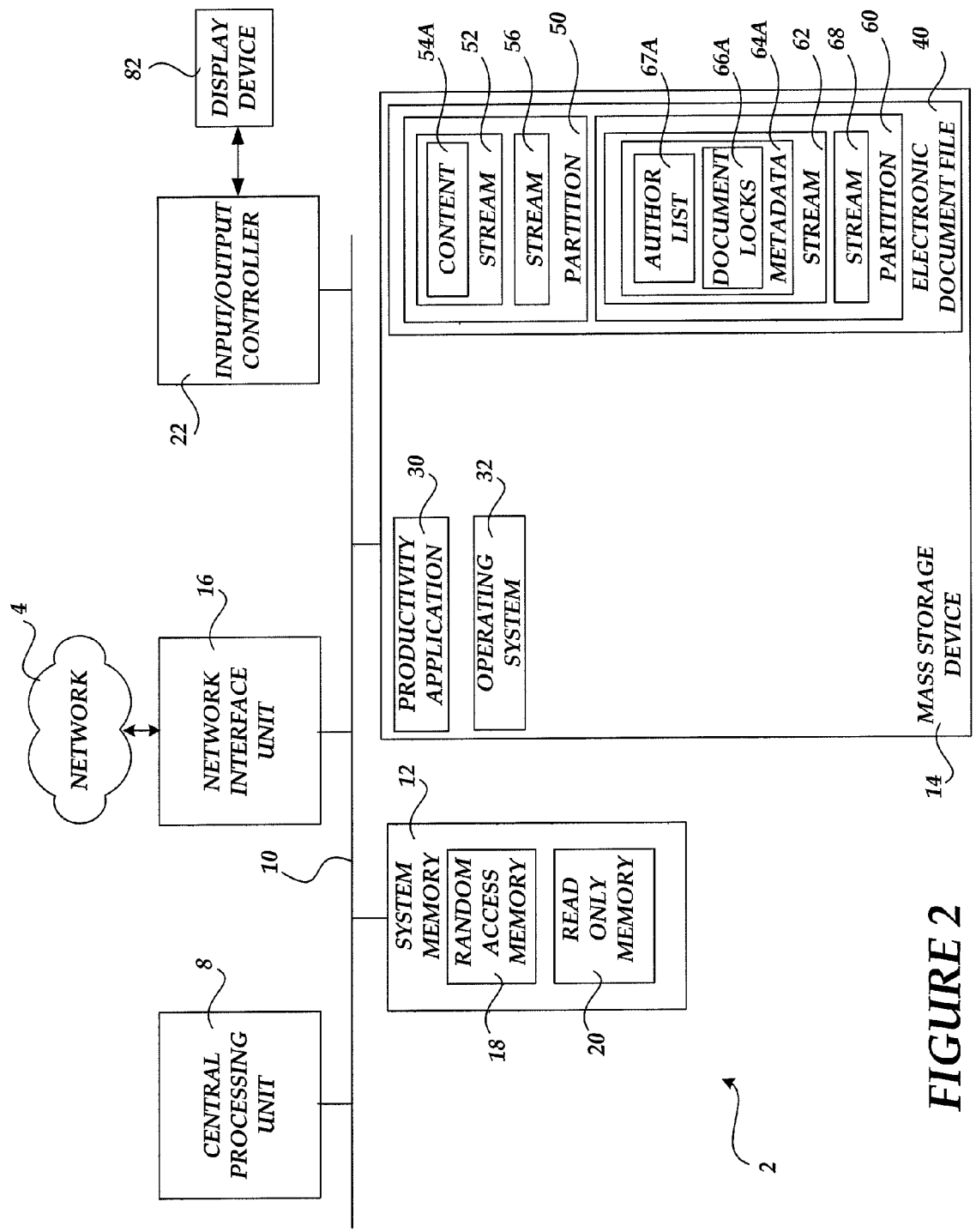
FIG. 2 is a block diagram illustrating a client computing environment which may utilize a server storage model for synchronizing file partitions, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including handheld devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the client computer 2 which may include a general purpose desktop, laptop, handheld, tablet, or other type of computer capable of executing one or more application programs. The client computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The client computer 2 further includes a mass storage device 14 for storing an operating system 32, the productivity application 30, and the electronic document file 40 which includes the partition 50, the streams 52, 56, 62, and 68, the content 54A, the metadata 64A, the author list 67A, and the document locks 66A, described above with respect to FIG. 1.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed or utilized by the client computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the client computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments, the client computer 2 may operate in a networked environment using logical connections to remote computers through the network 4 which may comprise, for example, a local network or a wide area network (e.g., the Internet). The client computer 2 may connect to the network 4 through a network interface unit 16 connected to the bus 10. It should be appreciated that the network interface unit 16 may also be utilized to connect to other types of networks and remote computing systems. The client computer 2 may also include an input/output controller 22 for receiving and processing input from a number of input types, including a keyboard, mouse, pen, stylus, finger, and/or other means. Similarly, an input/output controller 22 may provide output to a display device 82, a printer, or other type of output device. Additionally, a touch screen can serve as an input and an output mechanism. It should be appreciated that the client computer 6 and the server computer 70 shown in FIG. 1 may include many of the conventional components shown with respect to the client computer 2 in FIG. 2.

Figure 3:
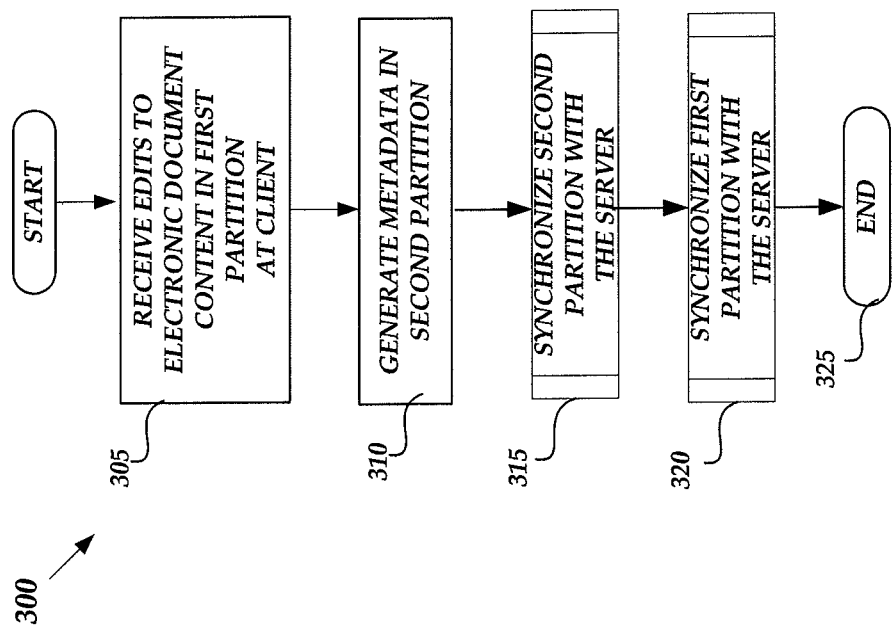
FIG. 3 is a flow diagram illustrating a routine for synchronizing file partitions utilizing a server storage model, in accordance with an embodiment.

FIG. 3 is a flow diagram illustrating a routine 300 for synchronizing file partitions utilizing a server storage model, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-7 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the productivity application 30 executing on the client computer 2 receives edits to electronic document content (contained in the stream 52) in the partition 50 of the electronic document file 40. In accordance with an embodiment, the electronic document file 40 may be downloaded from the server computer 70 including all of the partitions and streams contained therein. The partition 50 may then be opened in order to edit the content 54 contained therein, thereby creating the content 54A.

From operation 305, the routine 300 continues to operation 310 where the productivity application 30 generates the metadata 64A in the partition 60 of the electronic document file 40. In particular, the productivity application 30 may generate metadata to update the author list 67 in the partition 60 of the electronic document file 40 to add the user of the client computer 2 as an author (thereby generating the author list 67A). The productivity application 30 may also generate metadata to add a document lock 66A to the partition 60 of the electronic document file 40 to indicate that the electronic document file 40 is currently being edited by the user of the client computer 2.

From operation 310, the routine 300 continues to operation 315 where the productivity application 30 sends a request to the server application 42 to synchronize the partition 60 with the server computer 70 in order to save the changes made to the metadata 64 (i.e., the metadata 64A containing the author list 67A and the document lock 66A) to the server computer 70. It should be understood that the partition 60 may be synchronized independently from the partition 50 such that only the changed metadata 64A is saved to the server computer 70. An illustrative routine for synchronizing the partition 60 with the server computer will be described in greater detail below with respect to FIG. 4.

From operation 315, the routine 300 continues to operation 320 where the productivity application 30 sends a request to the server application 42 to synchronize the partition 50 with the server computer 70 in order to save the edited content 54A to the server computer 70. It should be understood that the partition 50 may be synchronized independently from the partition 60 such that only the edited content 54A is saved to the server computer 70. It should further be understood that the order of synchronization of the partitions 60 and 50 may be reversed such that the partition 50 is synchronized independently with the server computer 70 prior to the partition 60. An illustrative routine for synchronizing the partition 50 with the server computer 70 will be described in greater detail below with respect to FIG. 5. From operation 320, the routine 300 continues to operation 325 where it then ends. It should be understood that the operations 310-320, discussed above, may also be performed by the productivity application 30 executing on the client computer 6, in accordance with an embodiment.

Figure 4:
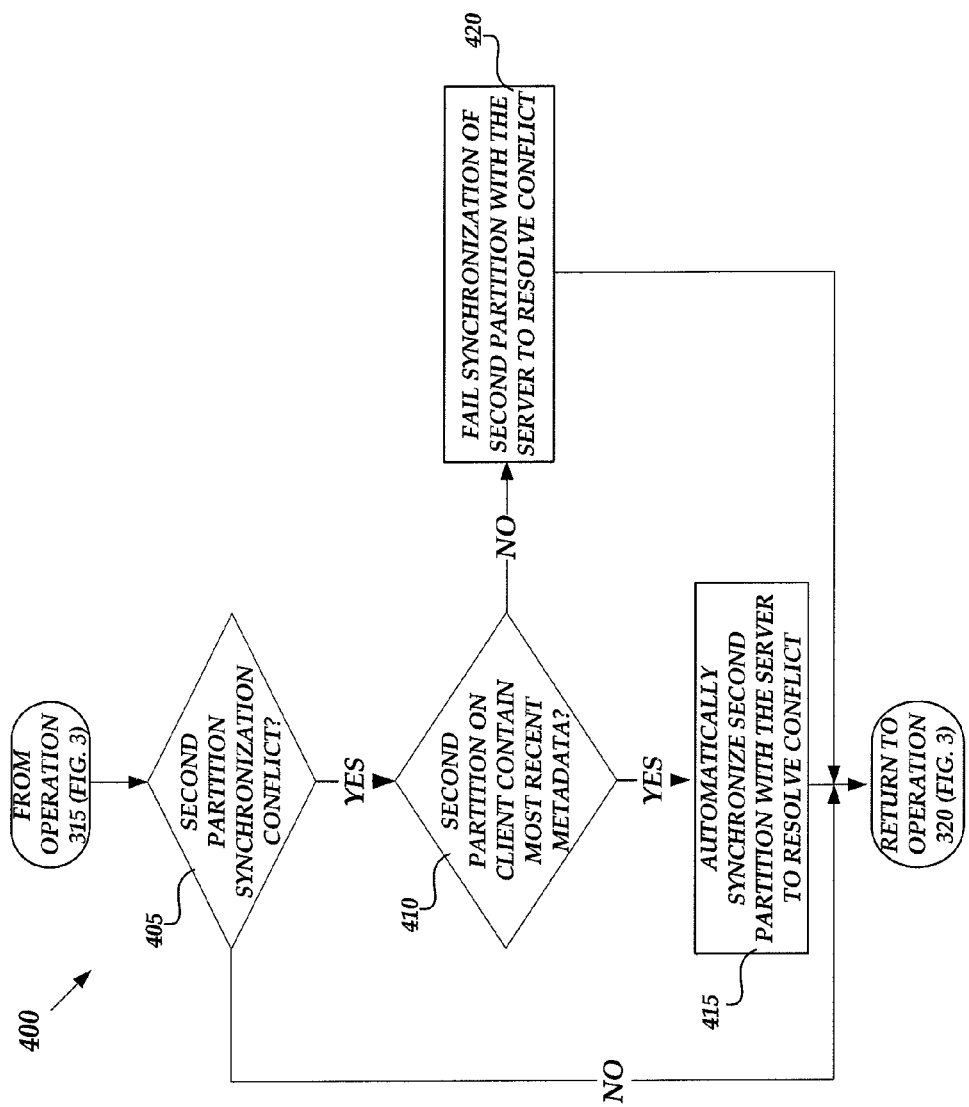
FIG. 4 is a flow diagram illustrating a routine for synchronizing a single file partition utilizing a server storage model, in accordance with the embodiment illustrated in FIG. 3.

FIG. 4 is a flow diagram illustrating a routine 400 for synchronizing a single file partition utilizing a server storage model, in accordance with the embodiment illustrated in FIG. 3. The routine 400 begins from operation 315 of FIG. 3 and continues to operation 405, where the server application 42 determines whether a conflict exists with synchronizing the partition 60 on the client computer 2 with the server computer 70. In particular and in accordance with an embodiment, the server application 42 may compare the metadata 64A stored in the partition 60 on the client computer 2 with the metadata 64 stored on the server computer 70 to determine any differences. If the metadata 64A and the metadata 64 are different, then the server application 42 determines there is a conflict and the routine 400 continues to operation 410. If there are no differences between the metadata 64A and the metadata 64, then the routine 400 returns to operation 320 of FIG. 3.

At operation 410, the server application 42 determines how to resolve the conflict based on whether the metadata 64A in the partition 60 on the client computer 2 is more recent than the metadata 64 stored on the server computer 70. In particular, the request from the productivity application 30 to synchronize the partition 60 may include a timestamp indicating when the metadata 64A was stored in the partition 60 on the client computer 2. The server application 42 may compare the timestamp with a timestamp indicating when the metadata 64 was stored in the partition 60 on the server computer 70. If it is determined that the metadata 64A is more recent than the metadata 64, then the routine 400 continues to operation 415. If it is determined that the metadata 64 is more recent than the metadata 64A, then the routine 400 branches to operation 420. It should be understood by those skilled in the art that, in accordance with another embodiment, the request from the productivity application 30 to synchronize the partition 60 may include a hypertext markup language ("HTTP") entity tag ("ETAG") to identify (and resolve) conflicts.

At operation 415, the server application 42 automatically synchronizes the partition 60 on the client computer 2 with the server computer 70 to resolve the conflict in favor of the most recent metadata 64A being present on the client computer 2. Thus, the server application 42 may update the metadata 64 in the partition 60 on the server computer 70 with the metadata 64A. From operation 415, the routine 400 returns to operation 320 of FIG. 3.

At operation 420, the server application 42 automatically causes the synchronization of the partition 60 on the client computer 2 with the server computer 70 to fail in order to resolve the conflict in favor of the metadata 64 being more recent than the metadata 64A. Thus, the server application 42 may maintain the metadata 64 in the partition 60 on the server computer 70. From operation 420, the routine 400 returns to operation 320 of FIG. 3.

Figure 5:
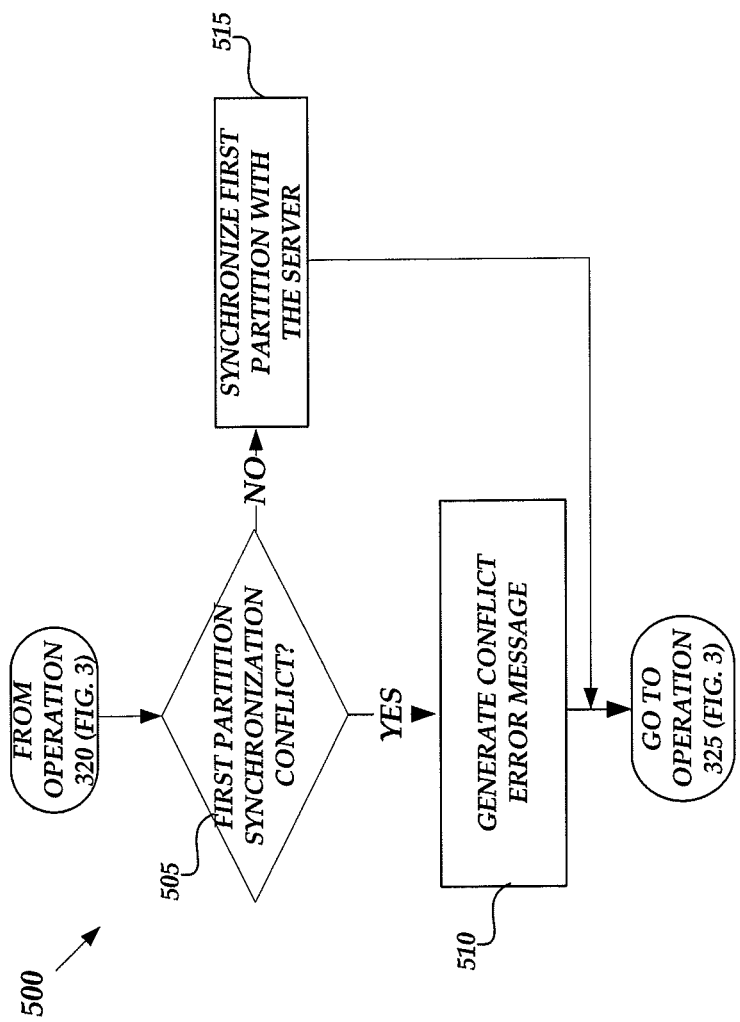
FIG. 5 is a flow diagram illustrating a routine for synchronizing another file partition utilizing a server storage model, in accordance with the embodiment illustrated in FIG. 3.

FIG. 5 is a flow diagram illustrating a routine 500 for synchronizing another file partition utilizing a server storage model, in accordance with the embodiment illustrated in FIG. 3. The routine 500 begins from operation 320 of FIG. 3 and continues to operation 505, where the server application 42 determines whether a conflict exists with synchronizing the partition 50 on the client computer 2 with the server computer 70. In particular and in accordance with an embodiment, the server application 42 may compare the content 54A stored in the partition 50 on the client computer 2 with the content 54 stored in the partition 50 on the server computer 70. If the content 54 contains edits which are not present in the edited content 54A in the partition 50 on the client computer 2, then the server computer 70 determines there is a conflict and the routine 500 continues to operation 510. If the content 54 does not contain any edits at all, then the routine 500 continues to operation 515.

At operation 510, the server application 42 generates a conflict error message for the user of the client computer 2. For example, the conflict error message generated by the server application 42 on the client computer 2 may include unseen edits to the content 54 (made, for example by a user of the client computer 6) which have been previously uploaded to the server 70. In response to the conflict error message, a user of the client computer 2 may manually resolve the conflict by merging the edited content 54A with the edits to the content 54, or alternatively, letting the previous edits to the content 54 remain unaltered on the server 70. From operation 510, the routine 500 returns to operation 325 of FIG. 3.

At operation 515, the server application 42 synchronizes the edited content 54A in the partition 50 with the server 70 to update the content 54 on the server 70 with the edited content 54A. From operation 515, the routine 500 returns to operation 325 of FIG. 3.

Figure 6:
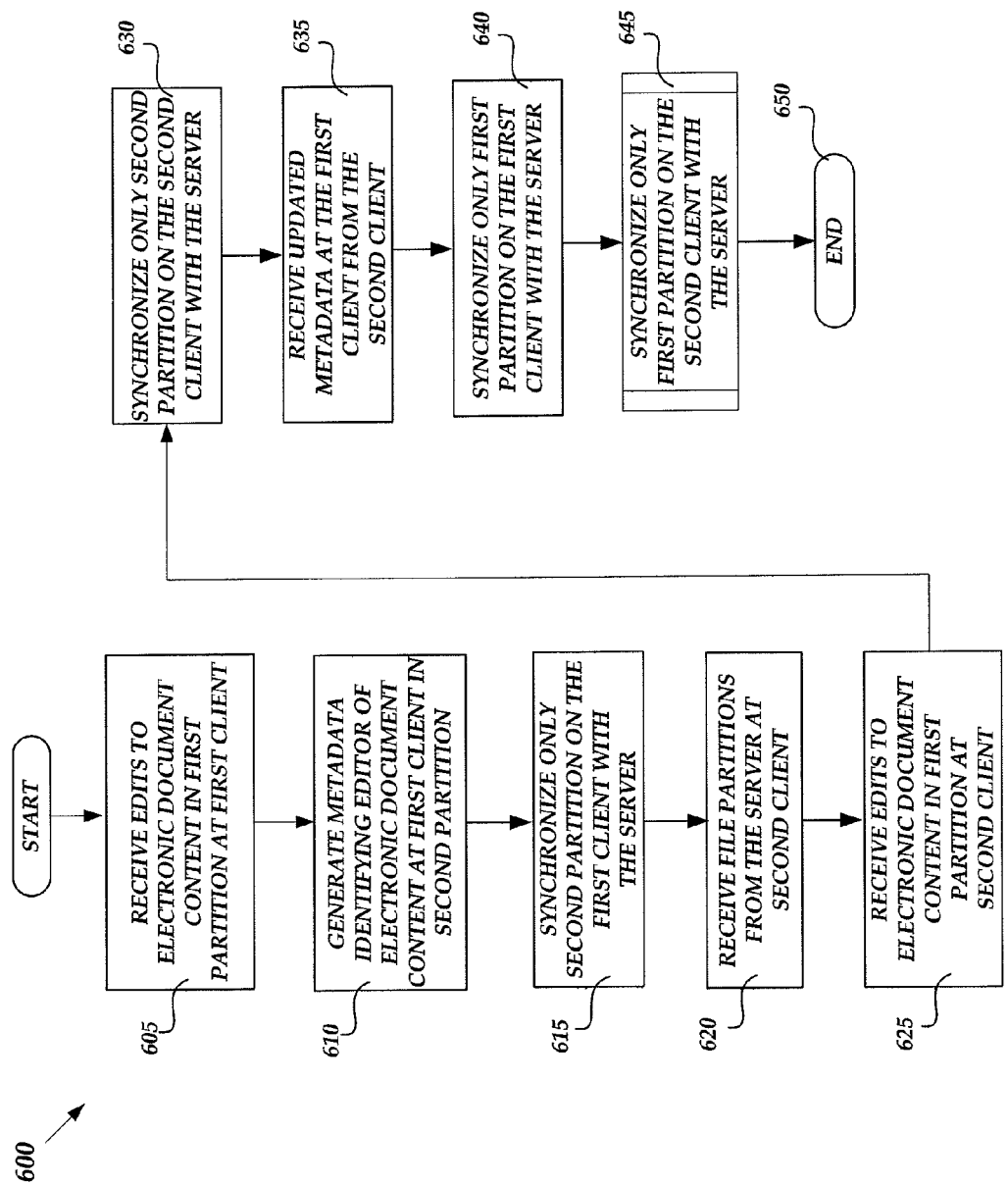
FIG. 6 is a flow diagram illustrating a routine for synchronizing file partitions utilizing a server storage model, in accordance with another embodiment.

FIG. 6 is a flow diagram illustrating a routine 600 for synchronizing file partitions utilizing a server storage model, in accordance with another embodiment. The routine 600 begins at operation 605, where the productivity application 30 executing on the client computer 2 receives edits to electronic document content (contained in the stream 52) in the partition 50 of the electronic document file 40. In accordance with an embodiment, the electronic document file 40 may be downloaded from the server computer 70 including all of the partitions and streams contained therein. The partition 50 may then be opened in order to edit the content 54 contained therein, thereby creating the content 54A.

From operation 605, the routine 600 continues to operation 610 where the productivity application 30 generates the metadata 64A in the partition 60 of the electronic document file 40 to identify the editor of the content 54A in the partition 50. In particular, the productivity application 30 may generate metadata to add the name of the editor of the content 54A to the author list 67 in the partition 60 of the electronic document file 40 (thereby generating the author list 67A).

From operation 610, the routine 600 continues to operation 615 where the productivity application 30 sends a request to the server application 42 to synchronize the partition 60 with the server computer 70 in order to save the changes made to the metadata 64 (i.e., the metadata 64A containing the author list 67A) to the server computer 70. It should be understood that the partition 60 may be synchronized independently from the partition 50 such that only the changed metadata 64A is saved to the server computer 70.

From operation 615, the routine 600 continues to operation 620 where the productivity application 30 executing on the client computer 6 receives the file partitions 50 and 60 (including the streams 42, 56, 62, and 68 contained therein) from the server computer 70 by downloading the electronic file 40. It should be understood that the client computer 6, in receiving the file partition 60, also receives the metadata 64A identifying the editor of the content 54A from the client computer 2, as a result of the synchronization of the partition 60 on the client computer 2 with the server computer 70 at operation 615. Thus, a user of the client computer 6 is able to determine that a user of the client computer 2 has also downloaded the content 54 from the server computer 70 for editing.

From operation 620, the routine 600 continues to operation 625 where the productivity application 30 executing on the client computer 6 receives edits to electronic document content (contained in the stream 52) in the partition 50 of the electronic document file 40. The partition 50 may then be opened in order to edit the content 54 contained therein, thereby creating the content 54B. It should be understood that the edited content 54B does not include the edits made on the client computer 2 (i.e., the edited content 54A).

From operation 625, the routine 600 continues to operation 630 where the productivity application 30 executing on the client computer 6 sends a request to the server application 42 to synchronize the partition 60 with the server computer 70 in order to save the changes made to the metadata 64 (i.e., the metadata 64B containing the author list 67B) to the server computer 70. It should be understood that the partition 60 may be synchronized independently from the partition 50 such that only the changed metadata 64B is saved to the server computer 70.

From operation 630, the routine 600 continues to operation 635 where the client computer 2 receives the metadata 64B identifying the editor of the content 54B from the client computer 6, as a result of the synchronization of the partition 60 with the server computer 70 at operation 630. In particular, the productivity application 30 executing on the client computer 2 may download the partition 60 from the server computer 70 which has been previously updated with the metadata 64B from the client computer 6. Thus, a user of the client computer 2 is able to determine that a user of the client computer 6 has also downloaded the content 54 from the server computer 70 for editing.

From operation 635, the routine 600 continues to operation 640 where the productivity application 30 executing on the client computer 2 sends a request to the server application 42 to synchronize the partition 50 with the server computer 70 in order to save the edited content 54A to the server computer 70. It should be understood that the partition 50 may be synchronized independently from the partition 60 such that only the edited content 54A is saved to the server computer 70. It should further be understood that the order of synchronization of the partitions 60 and 50 may be reversed such that the partition 50 is synchronized independently with the server computer 70 prior to the partition 60.

From operation 640, the routine 600 continues to operation 645 where the productivity application 30 executing on the client computer 6 sends a request to the server application 42 to synchronize the partition 50 with the server computer 70 in order to save the edited content 54B to the server computer 70. It should be understood that the partition 50 may be synchronized independently from the partition 60 such that only the edited content 54B is saved to the server computer 70. It should further be understood that the order of synchronization of the partitions 60 and 50 may be reversed such that the partition 50 is synchronized independently with the server computer 70 prior to the partition 60. An illustrative routine for synchronizing the partition 50 with the server computer 70 will be described in greater detail below with respect to FIG. 7. From operation 645, the routine 600 continues to operation 600 where it then ends.

Figure 7:
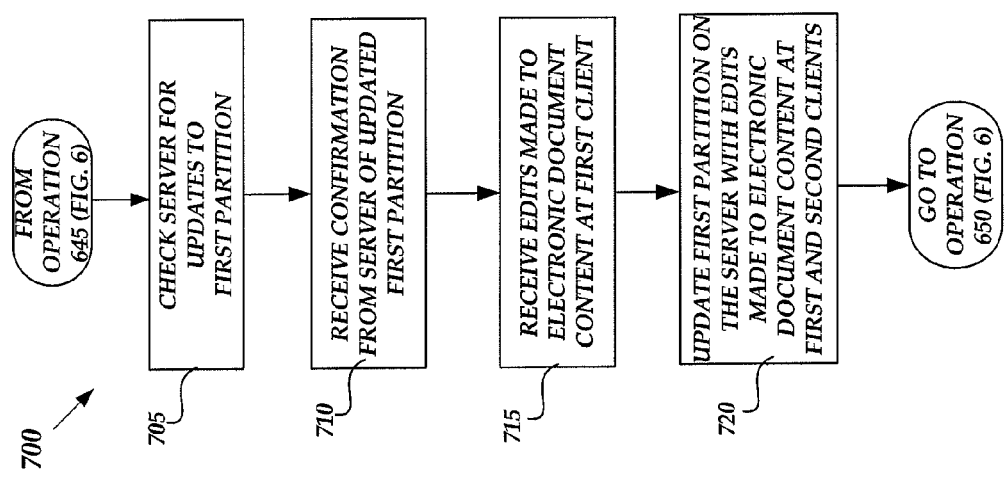
FIG. 7 is a flow diagram illustrating a routine for synchronizing a file partition on a second client computer utilizing a server storage model, in accordance with the embodiment illustrated in FIG. 6.

FIG. 7 is a flow diagram illustrating a routine 700 for synchronizing a file partition on a second client computer utilizing a server storage model, in accordance with the embodiment illustrated in FIG. 6. The routine 700 begins from operation 645 of FIG. 6 and continues to operation 605, where the productivity application 30 executing on the client computer 6 checks with the server computer 70 for any updates made to the partition 50. In particular, the productivity application 30 may send a query to the server application 42 as to whether the content 54 in the partition 60 on the server computer 70 has been updated by the client computer 2. As discussed above at operation 620 of FIG. 6, a user of the client computer 6 may be aware that the content 54 in the partition 50 of the server computer 70 is being edited by another user at the client computer 2 upon receiving the file partitions 50 and 60 in the electronic file 40 downloaded from the server computer 70.

From operation 705, the routine 700 continues to operation 710 where the client computer 6 receives a confirmation from the server application 42 that the partition 50 on the server computer 70 has been updated (i.e., by the client computer 2) and thus the edited content 54A from the client computer 2 is available to be merged with the edited content 54B in the partition 50 of the client computer 6. From operation 710, the routine 700 continues to operation 715 where the client computer 6 receives the edited content 54A from the server computer 70.

From operation 715, the routine 700 continues to operation 720 where the productivity application 30 executing on the client computer 6 requests the server application 42 on the server computer 70 to update the partition 50 with the edited content 54A (from the client computer 2) and the edited content 54B (from the client computer 6). From operation 720, the routine 700 returns to operation 650 of FIG. 6.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of synchronizing file partitions utilizing a server storage model in a client-server computer network, comprising:
   receiving, from a client computer, a request for synchronizing edits to content in an electronic document, the content associated with a file, the file comprising:
      a first partition comprising edits to the content, wherein the first partition is stored on the client computer as a client first partition and is stored on a server computer as a server first partition; and
      a second partition comprising metadata associated with the edits to the content, wherein the second partition is stored on the client computer as a client second partition and is stored on the server computer as a server second partition, wherein the metadata comprises at least one of: an editor of the content and a document lock;
   synchronizing the second partition between the client computer and the server computer to store the metadata in the client second partition on the server computer, comprising:
      comparing metadata stored in the client second partition with metadata stored in the server second partition;
      determining that a first conflict exists when the metadata stored in the client second partition is different from the metadata stored in the server second partition;
      upon determining that the first conflict exists, determining whether the metadata stored in the client second partition is more recent than the metadata stored in the server second partition;
      upon determining that the metadata in the client second partition is more recent, synchronizing the client second partition with the server second partition to resolve the first conflict; and
   synchronizing the client first partition between the client computer and the server computer to store the edits made to the content on the server computer.

2. The method of claim 1, wherein synchronizing the client first partition between the client computer and the server computer to store the edits made to the content on the server computer further comprises:
   comparing edits to the content stored in the client first partition with edits to the content stored in the server first partition; and
   determining that a second conflict exists when the edits to the content stored in the server first partition are different from the edits to the content stored in the client first partition.

3. The method of claim 2, wherein synchronizing the client first partition between the client computer and the server computer to store the edits made to the content on the server computer further comprises:
   upon determining that the second conflict exists, determining whether the edits to the content stored in the server second partition are more recent than the edits to the content stored in the client first partition; and
   upon determining that the edits to the content stored in the server second partition are not more recent, synchronizing the client first partition with the server first partition to resolve the second conflict.

4. The method of claim 3, wherein synchronizing the client first partition between the client computer and the server computer to store the edits made to the content on the server computer further comprises:
   upon determining that the edits to the content stored in the server second partition are more recent, causing the synchronization of the client first partition between the client computer and the server computer to fail; and
   sending, to the client computer, an indication of an error.

5. The method of claim 1, wherein the editor of the content indicates an author who is currently editing the electronic document.

6. The method of claim 1, wherein the document lock indicates that the electronic document is currently being edited.

7. The method of claim 1, wherein the server second partition comprises a first timestamp indicating when the metadata was stored in the server second partition, wherein the request for synchronizing edits to content further comprises a second timestamp indicating when the metadata was stored in the client second partition; and wherein comparing metadata stored in the client second partition with metadata stored in the server second partition comprises comparing the first timestamp and the second timestamp.

8. The method of claim 1, wherein the metadata associated with the edits to the content in the client first partition is generated in a stream of the client second partition.

9. A computer-readable storage medium comprising computer executable instructions which, when executed on a computer, will cause the computer to perform a method of synchronizing file partitions utilizing a server storage model, comprising:
    receiving, from a client computer, a request for synchronizing edits to content of an electronic document, the content associated with a file, the file comprising:
        a first partition comprising edits to the content, wherein the first partition is stored on the client computer as a client first partition and is stored on a server computer as a server first partition; and
        a second partition comprising metadata associated with the edits to the content, wherein the second partition is stored on the client computer as a client second partition and is stored on the server computer as a server second partition, wherein the metadata comprises at least one of: an editor of the content and a document lock;
    synchronizing the second partition between the client computer and the server computer to store the metadata in the client second partition on the server computer, comprising:
        comparing metadata stored in the client second partition with metadata stored in the server second partition;
        determining that a first conflict exists when the metadata stored in the client second partition is different from the metadata stored in the server second partition;
        upon determining that the first conflict exists, determining whether the metadata stored in the client second partition is more recent than the metadata stored in the server second partition;
        upon determining that the metadata in the client second partition is more recent, synchronizing the client second partition with the server second partition to resolve the first conflict; and
    synchronizing the client first partition between the client computer and the server computer to store the edits made to the content on the server computer.

10. The computer-readable storage medium of claim 9, wherein synchronizing the client first partition between the client computer and the server computer to store the edits made to the content on the server computer further comprises:
    comparing edits to the content stored in the client first partition with edits to the content stored in the server first partition; and
    determining that a second conflict exists when the edits to the content stored in the server first partition are different from the edits to the content stored in the client first partition.

11. The computer-readable storage medium of claim 10, wherein synchronizing the client first partition between the client computer and the server computer to store the edits made to the content on the server computer further comprises:
    upon determining that the second conflict exists, determining whether the edits to the content stored in the server second partition are more recent than the edits to the content stored in the client first partition; and
    upon determining that the edits to the content stored in the server second partition are not more recent, synchronizing the client first partition with the server first partition to resolve the second conflict.

12. The computer-readable storage medium of claim 11, wherein synchronizing the client first partition between the client computer and the server computer to store the edits made to the content on the server computer further comprises:
    upon determining that the edits to the content stored in the server second partition are more recent, causing the synchronization of the client first partition between the client computer and the server computer to fail; and
    sending, to the client computer, an indication of an error.

13. The computer-readable storage medium of claim 9, wherein the editor of the content indicates an author who is currently editing the electronic document.

14. The computer-readable storage medium of claim 9, wherein the document lock indicates that the electronic document is currently being edited.

15. A computer system, comprising:
    at least one processing unit; and
    at least one memory communicatively coupled to the at least one processing unit and storing computer executable instructions that, when executed by the at least one processing unit, cause the computing system to perform a method of synchronizing file partitions utilizing a server storage model in a client-server computer network, comprising:
        receiving, from a client computer, a request for synchronizing edits to content of an electronic document, the content associated with a file, the file comprising:
            a first partition comprising edits to the content, wherein the first partition is stored on the client computer as a client first partition and is stored on a server computer as a server first partition; and
            a second partition comprising metadata associated with the edits to the content, wherein the second partition is stored on the client computer as a client second partition and is stored on the server computer as a server second partition, wherein the metadata comprises at least one of: an editor of the content and a document lock;
        synchronizing the second partition between the client computer and the server computer to store the metadata in the client second partition on the server computer, comprising:
            comparing metadata stored in the client second partition with metadata stored in the server second partition;
            determining that a first conflict exists when the metadata stored in the client second partition is different from the metadata stored in the server second partition;
            upon determining that the first conflict exists, determining whether the metadata stored in the client second partition is more recent than the metadata stored in the server second partition;
            upon determining that the metadata in the client second partition is more recent, synchronizing the client second partition with the server second partition to resolve the first conflict; and
        synchronizing the client first partition between the client computer and the server computer to store the edits made to the content on the server computer.

16. The computer system of claim 15, wherein synchronizing the client first partition between the client computer and the server computer to store the edits made to the content on the server computer further comprises:
    comparing edits to the content stored in the client first partition with edits to the content stored in the server first partition; and
    determining that a second conflict exists when the edits to the content stored in the server first partition are different from the edits to the content stored in the client first partition.

17. The computer system of claim 16, wherein synchronizing the client first partition between the client computer and the server computer to store the edits made to the content on the server computer further comprises:
  upon determining that the second conflict exists, determining whether the edits to the content stored in the server second partition are more recent than the edits to the content stored in the client first partition; and
  upon determining that the edits to the content stored in the server second partition are not more recent, synchronizing the client first partition with the server first partition to resolve the second conflict.

18. The computer system of claim 17, wherein synchronizing the client first partition between the client computer and the server computer to store the edits made to the content on the server computer further comprises:
  upon determining that the edits to the content stored in the server second partition are more recent, causing the synchronization of the client first partition between the client computer and the server computer to fail; and
  sending, to the client computer, an indication of an error.

19. The computer system of claim 15, wherein the editor of the content indicates an author who is currently editing the electronic document.

20. The computer system of claim 15, wherein the document lock indicates that the electronic document is currently being edited.

\* \* \* \* \*